United States Patent [19]

Shibanai et al.

[11] Patent Number: 4,772,291

[45] Date of Patent: Sep. 20, 1988

[54] PROCESS FOR THE PREPARATION OF DENSELY COLORED PELLET FOR SYNTHETIC RESINS

[75] Inventors: Ichiro Shibanai, Tokyo; Kenji Nakamura, Osaka, both of Japan

[73] Assignee: Japan Liquid Crystal Co., Ltd., Tokyo, Japan

[21] Appl. No.: 862,069

[22] Filed: May 12, 1986

[51] Int. Cl.[4] .............................................. C09B 67/02
[52] U.S. Cl. ............................................ 8/526; 8/524
[58] Field of Search .................................. 8/526, 524

[56] References Cited

FOREIGN PATENT DOCUMENTS 59-47089  3/1984  Japan .

7006385  4/1970  Netherlands ............................ 8/526

Primary Examiner—Paul Lieberman
Assistant Examiner—John F. McNally
Attorney, Agent, or Firm—Jordan and Hamburg

[57] ABSTRACT

A process for the preparation of a densely colored pellet for addition to a synthetic resin involves converting a dye into a cyclodextrin clathrate compound thereof, powdering the clathrate compound by drying, mixing the powder with a synthetic resin material in a molten state and pelletizing the mixture. The obtained pellet can be uniformly dispersed in a synthetic resin material to color the resin material without causing bleeding of the dye or fading of the product.

16 Claims, No Drawings

PROCESS FOR THE PREPARATION OF DENSELY COLORED PELLET FOR SYNTHETIC RESINS

BACKGROUND OF THE INVENTION

1. Field of the Invention

The present invention relates to a process for the preparation of a densely colored pellet for a synthetic resin which contains a dye as a coloring material, exhibits no bleeding and has such a high dispersibility as to easily color a synthetic resin uniformly.

2. Description of the Prior Art

Up to this time, a synthetic resin such as polyethylene, polypropylene, polyvinyl chloride or the like could not have been colored except with a pigment. From the standpoint of coloring itself, it may be possible to color such a resin with a dye. However, when such a resin is colored with a dye, the dye bleeds to the surface and blooms on the surface. Further, color changes (discoloration or fading) occur and the bleeding dye is transferred to a substance in contact with the resin to foul the substance. Accordingly, the above-described resin cannot in present practice be colored with a dye.

SUMMARY OF THE INVENTION

The present invention provides a process for the preparation of a densely colored pellet for a synthetic resin which comprises converting a dye into a clathrate compound thereof with cyclodextrin or a cyclodextrin-containing decomposed starch, powdering the clathrate comound by drying, mixing the powdered clathrate compound with a synthetic resin material in a molten state and pelletizing the mixture. According to the present invention, a dye is converted into the corresponding clathrate compound. Therefore, the resulting densely colored pellet can be dispersed in a synthetic resin uniformly by mixing the pellet with the resin and color the resin without bleeding of the dye or fading of the product. The present invention enables practical coloring of a synthetic resin with a dye.

DETAILED DESCRIPTION OF THE PREFERRED EMBODIMENTS

Examples of the dye to be used in the present invention include anthraquinone dye, indigoid dye, indigosol dye, triphenylmethane dye, sulfur dye, pthalocyanine dye, stilbene dye, nitroso dye, nitro dye, thiazole dye, xanthene dye, acridine dye, azine dye, oxazine dye, thiazine dye, cyanin dye, diphenylmethane dye, triarylmethane dye, xanthene dye, quinoline dye, methine dye, polymethine dye, indamine dye, indophenol dye, aminoketone dye, oxyketone dye or the like.

The cyclodextrin to be used in the present invention is a specific dextrin having a structure where D-glucose molecules are bonded by an $\alpha$-1,4 linkage to form a ring and is characterized by having a doughnutlike molecular structure having a cavity of a diameter of 6 to 10 Å therein. There are three types, i.e. $\alpha$-, $\beta$- and $\gamma$-types of cyclodextrin depending upon the number of D-glucose units and any type of cyclodextrin can be used in the present invention. Among these types, $\beta$-cyclodextrin is a white crystalline powder represented by the molecular formula $(C_6H_{10}O_5)_7$ and having a molecular weight of 1135 and a melting point of 300° to 305° C. (dec.).

The cyclodextrin-containing decomposed starch to be used in the present invention instead of cyclodextrin can be prepared by various methods. For example, it can be obtained as an intermediate product in the preparation of cyclodextrin by the action of a cyclodextrin-generating enzyme produced by a microorganism of the genus Bacillus on starch. The process will now be described in more detail.

A starch solution is adjusted to a pH of 10, homogeneously gelatinized and cooled. Cyclodextrin glycosyltransferase, which is a fermentation product of a microorganism selected from among Bacillus Nos. 13, 17-1, 38-2, 135 and 169 bacteria, has an optimum pH in an alkaline region and exhibits a high temperature stability, is added to the solution to carry out the reaction. The reaction mixture is heated to deactivate the enzyme and cooled, followed by adjusting the pH to 5.0. A commercially-available glucamylase is added to the reaction mixture to decompose unreacted substances. The resulting reaction mixture is filtered by an ordinary method and concentrated to give a cyclodextrin concentration of about 40% or above. A small amount of cyclodextrin is added to the concentrated reaction mixture as a seed. The resulting mixture is allowed to stand, thus precipitating cyclodextrin. The precipitated cyclodextrin is filtered and dried to obtain $\beta$-cyclodextrin, while the objective cyclodextrin-containing decomposed starch is obtained as the resulting filtrate (see Japanese Patent Publication No. 43897/1977).

The above-described Bacillus Nos. 13, 17-1, 38-2, 135 and 169 bacteria have been deposited with the Fermentation Research Institute of the Agency of Industrial Science and Technology under FERM Nos. 611, 612, 614, 617 and 618, respectively.

A condensate obtained by purifying the above described filtrate with an ion exchange resin and condensing the purified filtrate is generally put on the market as a cyclodextrin-containing malt syrup. This cyclodextrin-containing malt syrup can also be used in the present invention.

The cyclodextrin-containing decomposed starch to be used in the present invention is not restricted to those prepared by the above method, but may be any decomposed starch containing $\alpha$, $\beta$ or $\gamma$-cyclodextrin or a mixture thereof which has been prepared by an method.

The clathrate compound of a dye with cyclodextrin can be prepared by various methods including, for example, kneading. That is, about 0.1 to 6 times by weight as much water or hot water as cyclodextrin is added to cyclodextrin to obtain a paste or a suspension. About 0.1 to 3 times by weight as much dye as the cyclodextrin is added to the paste or suspension. The resulting mixture is sufficiently kneaded by a ball mill, dispermill or the like. The kneading time is 0.5 to 12 hours, preferably 1 to 3 hours. When cyclodextrin is added to a dye and the mixture is kneaded sufficiently as described above, the dye enters into a cavity within a cyclodextrin molecule to form the corresponding clathrate compound. The resulting paste after the formation of the clathrate compound is dried and powdered with a vacuum dryer or a spray dryer. The formation of the clathrate compound and the powdering are preferably carried out at 60° C. or below.

Examples of the synthetic resin to be used in the present invention include polyethylene, polypropylene, vinyl chloride resin, ethylene-vinyl acetate copolymer or the like, but are not limited to these resins.

Now, the following Examples will further describe the process for the preparation of a densely colored pellet for a synthetic resin according to the present invention.

EXAMPLE 1

85 parts by weight of α-cyclodextrin was added to 15 parts by weight of an anthraquinone dye. The mixture was stirred for one hour, while keeping it at 50° C., thus obtaining a clathrate compound of the dye with cyclodextrin. The clathrate compound was powdered at a drying temperature of 60° C. with a vacuum dryer or a spray dryer into a powder having a particle size smaller than 150 mesh. 40 parts by weight of the powder was mixed with 60 parts by weight of a non-rigid vinyl chloride resin compound. The resulting mixture was molten and pelletized according to the cold-cutting method.

EXAMPLE 2

85 parts by weight of α-cyclodextrin was added to 15 parts by weight of an azo dye. The resulting mixture was stirred for one hour, while keeping it at 50° C., thus obtaining a clathrate compound of the dye with cyclodextrin. The clathrate compound was powdered at a drying temperature of 60° C. with a vacuum dryer or a spray dryer into a powder having a particle size smaller than 150 mesh. 40 parts by weight of the powder was mixed with 60 parts by weight of a polyethylene compound. The resulting mixture was molten and pelletized according to the hot-cutting method.

EXAMPLE 3

90 parts by weight of α-cyclodextrin was added to 10 parts by weight of a phthalocyanine dye. The mixture was stirred for one hour, while keeping it at 50° C., thus obtaining a clathrate compound of the dye. The clathrate compound was powdered at a drying temperature of 60° C. with a vacuum dryer or a spray dryer into a powder having a particle size smaller than 150 mesh. 60 parts by weight of the powder was mixed with 40 parts by weight of a polypropylene compound. the mixture was molten and pelletized according to the underwater cutting method.

EXAMPLE 4

80 parts by weight of α-cyclodextrin was added to 20 parts by weight of a stilbene dye. The mixture was stirred for one hour, while keeping it at 50° C., thus obtaining a cyclodextrin clathrate of the dye. The clathrate compound was powdered at a drying temperature of 60° C. with a vacuum dryer or a spray dryer into a powder having a particle size smaller than 150 mesh. 50 parts by weight of the powder was mixed with 50 parts by weight of an ethylene-vinyl acetate copolymer. The mixture was molten and pelletized according to the sheet cutting method.

The densely colored pellet prepared according to the above procedure is added to a synthetic resin material generally in an amount of 1 to 10%. The amount of the pellet added may be suitably varied depending upon the color density. Further, the coloring can be carried out by mere mixing, so that the operation is simple. The resulting colored compound is molded according to an ordinary method such as injection, blow, extruding or film molding to give a desired molded article which is colored uniformly. When the densely colored pellet of the present invention is used, the product does not cause bleeding of a dye nor fading as compared with the case where the dye is directly added to a synthetic resin material. Further, the dispersibility of the dye is improved, so that the amount of the dye used is only 20 to 30% based on the amount used in the case where the dye is directly added, which is economically advantageous. Furthermore, the uniform coloring can be achieved by a simple mixing operation.

As described above, according to the present invention, the fading of a product and the bleeding of a dye can be prevented by converting a dye into the corresponding cyclodextrin clathrate compound. Further, when the resulting densely colored pellet is added to a synthetic resin material, the material can be uniformly colored with a small amount of a dye without suffering from color shading, because of an improved dispersibility of the dye, thus obtaining a synthetic resin article which is colored with a tone which cannot be obtained by the use of pigments and has clearness and depth. Accordingly, the present invention has significant effects.

What is claimed is:

1. A process for preparing a colored pellet for use in coloring a synthetic resin, comprising the steps of forming a clathrate compound of a dye with cyclodextrin, forming a powder of said clathrate compound, mixing the powdered clathrate compound with a synthetic resin material, and forming pellets from said mixture.

2. A process as in claim 1, wherein the clathrate compound is formed into a powder by drying at a temperature no higher than about 60° C.

3. A process as in claim 1, wherein the powdered clathrate compound is mixed with the synthetic resin material in a molten state.

4. A process as in claim 1, wherein the dye is selected from the group consisting of anthraquinone dye, indigoid dye, indigosol dye, triphenylmethane dye, sulfur dye, phthalocyanine dye, stilbene dye, nitroso dye, nitro dye, thiazole dye, xanthene dye, acridine dye, azine dye, oxazine dye, thiazine dye, cyanin dye, diphenylmethane dye, triarylmethane dye, xanthene dye, quionline dye, methine dye, polymethine dye, indamine dye, indophenol dye, aminoketone dye, and oxyketone dye.

5. A process as in claim 1, wherein the synthetic resin material is selected from the group consisting of polyethylene, polypropylene, vinyl chloride resin, and ethylene-vinyl acetate copolymer.

6. A process as in claim 1, wherein the weight ratio of dye to cyclodextrin ranges from about 0.1 to 3.

7. A process as in claim 1, wherein the clathrate compound is formed at a temperature no higher than about 60° C.

8. A process as in claim 1, wherein the pellets are formed by a method selected from the group consisting of the cold-cutting method, the hot-cutting method, the underwater cutting method and the sheet cutting method.

9. A process for preparing a colored pellet for use in coloring a synthetic resin, comprising the steps forming a clathrate compound of a dye with a decomposed starch containing cyclodextrin, forming a powder of said clathrate compound, mixing the powdered clathrate compound with a synthetic resin material, and forming pellets from said mixture.

10. A process as in claim 9, wherein the clathrate compound is formed into a powder by drying at a temperature no higher than about 60° C.

11. A process as in claim 9, wherein the powdered clathrate compound is mixed with the synthetic resin material in a molten state.

12. A process as in claim 9, wherein the dye is selected from the group consisting of anthraquinone dye, indigoid dye, indigosol dye, triphenylmethane dye, sulfur dye, phthalocyanine dye, stilbene dye, nitroso dye, nitro dye, thiazole dye, xanthene dye, acridine dye, azine dye, oxazine dye, thiazine dye, cyanin dye, diphenylmethane dye, triarylmethane dye, xanthene dye, quinoline dye, methine dye, polymethine dye, indamine dye, indophenol dye, aminoketone dye, and oxyketone dye.

13. A process as in claim 9, where in the synthetic resin material is selected from the group consisting of polyethylene, polypropylene, vinyl chloride resin, and ethylene-vinyl acetate copolymer.

14. A process as in claim 9, wherein the weight ratio of dye to cyclodextrin ranges from about 0.1 to 3.

15. A process as in claim 9, wherein the clathrate compound is formed at a temperature no higher than about 60° C.

16. A process as in claim 9, wherein the pellets are formed by a method selected from the group consisting of the cold-cutting method, the hot-cutting method, the underwater cutting method and the sheet cutting method.

* * * * *